Patented May 20, 1952

2,597,467

UNITED STATES PATENT OFFICE 2,597,467

PRODUCTION OF SYNTHETIC RESINS

James Wotherspoon Fisher and Edward William Wheatley, Spondon, near Derby, England, assignors to Celanese Corporation of America, a corporation of Delaware No Drawing. Application July 3, 1948, Serial No. 37,088. In Great Britain July 22, 1947

24 Claims. (Cl. 260—39)

This invention relates to the manufacture of certain novel synthetic resins.

In the process of the invention synthetic resins are made by the interaction of an aldehyde and a hydrazide of a dicarboxylic or polycarboxylic acid in which two ore more carboxyl groups are combined with hydrazine. As the aldehyde it is preferred to use formaldehyde and the invention will be more particularly described by reference to formaldehyde, though a higher aldehyde, e. g. acetaldehyde, may be used. As the hydrazide it is preferred to use a hydrazide of a dicarboxylic acid in which the two carboxyl groups are combined with different molecules or the same molecule of hydrazine, in this latter case forming a ring structure.

The reaction may be carried out by heating the hydrazide with the aldehyde, preferably in a liquid medium which may with advantage be a solvent for the two reactants. For example, very good results are obtained by heating an aqueous solution of a water-soluble dicarboxylic acid dihydrazide or cyclic monohydrazide and formaldehyde to a temperature above 50° C., and especially by boiling such a solution under reflux conditions. At about the boiling point of water the reaction takes place quite rapidly, even in the absence of condensation catalysts; for example it is usually sufficient to boil the aqueous solution for a few minutes, e. g. for between about 2 and 15 minutes. If the solution is then allowed to cool, the reaction product of the hydrazide and formaldehyde separates, in most cases spontaneously, in the form of a gel, which may then be broken up and dried, for example by heating it to about 100°–120° C. It may however sometimes be necessary to concentrate the solution in order to cause the reaction product to gel, especially when the molecular ratio of formaldehyde to dihydrazide is low, e. g. in the neighbourhood of 1:1. When the molecular ratio is very high, e. g. 6:1 or more, it may be necessary to dilute the solution with water in order to cause the resin to separate.

The above reaction conditions may be varied if desired. For example, temperatures below the boiling point of water may be employed with longer reaction times, or the solution may be heated to higher temperatures under pressure. Usually the reaction time may be considerably prolonged beyond the minimum necessary without greatly affecting the properties of the resin produced, although such prolongation may cause the resin to precipitate from the solution before the solution is cooled, especially when the molecular ratio of formaldehyde to dihydrazide is fairly high, e. g. 3:1 or higher.

While the use of catalysts is in general not necessary, a catalyst for condensation reactions may be employed if desired. Examples of suitable catalysts are hydrogen chloride and aromatic sulphonic acids, especially benzene sulphonic acid and the toluene sulphonic acids. When a catalyst is used it is possible to employ lower reaction temperatures than are otherwise necessary for a given rate of reaction.

The properties of the resins produced in accordance with the invention depend largely on the molecular proportions in which the two reactants are employed. Thus if a resin melting below about 150° C. is required, the molecular ratio of formaldehyde to dihydrazide may be between 0.8 and 1.5; for example, when approximately equimolecular proportions of formaldehyde and dihydrazide are used, resins of melting point about 100° C., which are soluble in hot water and swollen or, in most cases, dissolved by methanol can be obtained. As the proportion of formaldehyde is increased the melting point of the resin obtained rises rapidly while its solubility in water and in methanol decreases. The molecular proportions of the two reactants required to give a resin of high melting point vary to some extent with the particular dihydrazide employed, but in general resins which are completely insoluble in water and in methanol, and which have a melting or decomposition point above 150° C. and usually above 250° C., can be obtained by employing between about 3 and 5 molecular proportions of formaldehyde for each molecular proportion of the dihydrazide.

The new resins can be formed from the dihydrazides of aliphatic, aromatic and heterocyclic dicarboxylic acids. For most purposes it is preferable to make use of dihydrazides of dicarboxylic acids in which the carboxyl groups are separated by a chain of 3 or more atoms, which may be either all carbon atoms or carbon atoms with one or more atoms other than carbon, e. g. oxygen or sulphur atoms. Examples of such acids are adipic acid, pimelic acid, suberic acid, azelaic acid, sebacic acid, aniline-N:N-bis-propionic acid, sulpha-bis-propionic acid and piperazine-N:N':bis-propionic acid. Resins made from dihydrazides of oxalic acid or other acids in which the carboxyl groups are separated by less than 3 atoms, and from cyclic hydrazides of dicarboxylic acids such as phthalic hydrazide o-$C_6H_4(CONH-)_2$, have a very high melting point, and are not thermoplastic at temperatures below about 120° C. If desired the di-carboxylic acid hydrazide may contain other reactive groups, e. g. hydroxyl, free or esterified carboxyl, or nitrogen-containing groups other than the hydrazide group.

Coloured products may be made by dyeing the novel resins of the invention with suitable dyes, in particular water-soluble acid wool dyes, water-insoluble dyes such for example as can be employed in aqueous dispersions for dyeing cellulose acetate materials, and direct cotton dyes. Preferably the dye is incorporated with one or both of the reactants before the resin is formed. For example the dye may be added to a hot aqueous solution of the dihydrazide, after which the formaldehyde is added and the solution heated to boiling as already described. Examples of suitable dyes are: among wool dyes Fast Red A (Colour Index 176), among water-insoluble dyes 1:4-di-(methylamino)-anthraquinone, and among cotton dyes Sky Blue FF (Colour Index 518).

The invention also includes the production of resins by reaction between a dihydrazide or cyclic hydrazide and formaldehyde in the presence of another compound capable of reacting with formaldehyde to give resinous products, e. g. urea, thiourea, phenol, m-cresol or resorcinol, and/or in the presence of a drying oil, for instance linseed oil. The presence of such compounds tends to improve the thermo-setting properties of the new resins. The proportion in which such compounds are employed will vary in accordance with the properties required in the resin.

The resins of the invention (with the exception of some derived from dihydrazides in which the hydrazide groups are separated by less than 3 atoms or from cyclic hydrazides such as phthalic hydrazide) are readily mouldable, for example at temperatures of about 150°–180° C., and can be sawn, drilled, turned and otherwise machined. If desired the new resins may be used in association with plasticisers, e. g. tricresyl phosphate, dimethyl-, diethyl or dibutyl phthalate, dimethyl-glycol-phthalate or dibutyl-glycol-phthalate, dibutyl-sebacate, or triacetin.

The invention is illustrated by the following example:

*Example*

348 parts by weight of adipic dihydrazide was dissolved in 1000 parts of hot water and the temperature of the solution raised to 100° C. 680 parts by weight of a pre-heated 35.4% aqueous solution of formaldehyde was then added and the solution boiled under reflux for 15 minutes. The solution was then cooled, whereupon it rapidly gelled. The gel was broken up and dried in an oven at 100–110° C. The product was a resin melting with decomposition at about 280° C. and insoluble in hot water and in methanol.

A sample of the resin was moulded into a clear flat disc 2" in diameter and ¼" thick by the following process. The resin was first heated from room temperature up to 160° C. under a pressure of 500 lb/sq. in. during 45 minutes. The pressure was then increased to 1,000 lb./sq. in. for 5 minutes, after which the resin was allowed to cool to 50° C. under a pressure of 1,000 lb./sq. in., and was then removed from the press.

A more readily thermo-setting resin is obtained if instead of the 348 parts of adipic dihydrazide there are employed 300 parts of adipic dihydrazide and 16 parts of urea.

Resins of similar properties were also obtained when the adipic dihydrazide was replaced by pimelic, suberic, azelaic, or sebacic dihydrazide. When oxalic dihydrazide, phthalic dihydrazide or the cyclic phthalic hydrazide was used, high melting resins of much lower thermo-plasticity were obtained.

Having described our invention, what we desire to secure by Letters Patent is:

1. A process for the production of synthetic resins, which comprises heating a mixture of at most three reactants, each of which can undergo reaction with one of the others, of which one must be formaldehyde and another must be a hydrazide of an acid containing two carboxyl groups as the only non-hydrocarbon substituent groups, both carboxyl groups being combined with hydrazine, and the third being a compound capable of forming a resinous product by condensation with formaldehyde.

2. A process for the production of synthetic resins, which comprises heating in a common solvent to a temperature above 50° C. a mixture of at most three reactants, each of which can undergo reaction with one of the others, of which one must be formaldehyde and another must be a hydrazide of an acid containing two carboxyl groups as the only non-hydrocarbon substituent groups, both carboxyl groups being combined with hydrazine, and the third being capable of forming a resinous product by condensation with formaldehyde.

3. A process for the production of synthetic resins, which comprises heating to a temperature above 50° C. an aqueous solution of a mixture consisting of formaldehyde and a water-soluble dihydrazide of a dicarboxylic acid in which the carboxyl groups are the only non-hydrocarbon substituent groups.

4. A process for the production of synthetic resins, which comprises heating to a temperature above 50° C. an aqueous solution of a mixture consisting of formaldehyde and a water-soluble cyclic monohydrazide of a dicarboxylic acid in which the carboxyl groups are the only non-hydrocarbon substituent groups and are both combined with hydrazine.

5. A process for the production of synthetic resins, which comprises heating in a common solvent to a temperature above 50° C. a mixture of at most three reactants, each of which can undergo reaction with one of the others, of which one must be formaldehyde and another must be a hydrazide of an acid containing two carboxyl groups as the only non-hydrocarbon substituent groups and are separated by a chain of at least 3 atoms, both carboxyl groups being combined with hydrazine, and the third being a compound capable of forming a resinous product by condensation with formaldehyde.

6. A process for the production of synthetic resins, which comprises heating to a temperature above 50° C. an aqueous solution of a mixture consisting of formaldehyde and a water-soluble dihydrazide of a dicarboxylic acid in which the carboxyl groups are the only non-hydrocarbon substituent groups, discontinuing the heating before the reaction product begins to precipitate, and causing the reaction product to gel by cooling the solution.

7. Process according to claim 5, wherein the molecular ratio of formaldehyde to hydrazide is between 0.8 and 1.5, and a resin melting below 150° C. and soluble in hot water and at least swollen by methanol is obtained.

8. Process according to claim 2, wherein the molecular ratio of formaldehyde to hydrazide is between 3 and 5, and a resin melting above 150° C. and insoluble in water and in methanol is obtained.

9. Process according to claim 2, wherein the reaction between the formaldehyde and dihydrazide is performed in the presence of a dye selected from the group which consists of water-soluble acid wool dyes, water-insoluble dyes dispersible in water and direct cotton dyes, whereby a colored resin is obtained.

10. A process for the production of synthetic resins, which comprises heating to boiling an aqueous solution of a mixture consisting of formaldehyde and a water-soluble dihydrazide of a dicarboxylic acid in which the carboxyl groups are the only non-hydrocarbon substituent groups and are separated by a chain of at least 3 atoms, the molecular ratio of formaldehyde to dihydrazide being between 0.8 and 1.5, subjecting the solution so obtained to such cooling and concentration as are required to cause the reaction product to gel, and separating the gelled product from the water.

11. A process for the production of synthetic resins, which comprises heating to boiling an aqueous solution of a mixture consisting of formaldehyde and a water-soluble dihydrazide of a dicarboxylic acid in which the carboxyl groups are the only non-hydrocarbon substituent groups and are separated by a chain of at least 3 atoms, the molecular ratio of formaldehyde to dihydrazide being between 3 and 5, subjecting the solution so obtained to such cooling and concentration as are required to cause the reaction product to gel, and separating the gelled product from the water.

12. A process for the production of synthetic resins, which comprises heating to boiling an aqueous solution of a mixture consisting of formaldehyde and a water-soluble dihydrazide of a polymethylene dicarboxylic acid in which the carboxyl groups are separated by a chain of at least 3 carbon atoms, the molecular ratio of formaldehyde to dihydrazide being between 0.8 and 1.5, subjecting the solution so obtained to such cooling and concentration as are required to cause the reaction product to gel, and separating the gelled product from the water.

13. A process for the production of synthetic resins, which comprises heating to boiling an aqueous solution of a mixture consisting of formaldehyde and a water-soluble dihydrazide of a polymethylene dicarboxylic acid in which the carboxyl groups are separated by a chain of at least 3 carbon atoms, the molecular ratio of formaldehyde to dihydrazide being between 3 and 5, subjecting the solution so obtained to such cooling and concentration as are required to cause the reaction product to gel, and separating the gelled product from the water.

14. As new substances resinous condensation products of formaldehyde and a hydrazide of a dicarboxylic acid in which the carboxyl groups are the only non-hydrocarbon substituent groups and are both combined with hydrazine.

15. As new substances resinous condensation products of formaldehyde and a dihydrazide of a dicarboxylic acid in which the carboxyl groups are the only non-hydrocarbon substituent groups.

16. As new substances resinous condensation products of formaldehyde and a dihydrazide of a dicarboxylic acid in which the carboxyl groups are the only non-hydrocarbon substituent groups and are separated by a chain of at least 3 atoms.

17. As new substances resinous condensation products of formaldehyde and a cyclic monohydrazide of a dicarboxylic acid in which the carboxyl groups are the only non-hydrocarbon substituent groups.

18. As new substances resinous condensation products of formaldehyde and a dihydrazide of a dicarboxylic acid in which the carboxyl groups are the only non-hydrocarbon substituent groups and are separated by a chain of at least 3 atoms the molecular ratio of formaldehyde to hydrazide being between 0.8 and 1.5, the said condensation products having a melting point below 150° C. and being soluble in hot water and at least swollen by methanol.

19. As new substances resinous condensation products of formaldehyde and a dihydrazide of a dicarboxylic acid in which the carboxyl groups are the only non-hydrocarbon substituent groups and are separated by a chain of at least 3 atoms, the molecular ratio of formaldehyde to hydrazide being between 3 and 5, the said condensation products having a melting point above 150° C. and being insoluble in hot water and in methanol.

20. As new substances resinous condensation products of formaldehyde, a hydrazide of a dicarboxylic acid in which the carboxyl groups are the only non-hydrocarbon substituent groups and are both combined with hydrazine, and a third compound which is capable of forming a resinous product by a condensation reaction with formaldehyde.

21. As new substances resinous condensation products of formaldehyde, a dihydrazide of a dicarboxylic acid in which the carboxyl groups are the only non-hydrocarbon substituent groups and are separated by a chain of at least 3 carbon atoms, and a third compound which is capable of forming a resinous product by a condensation reaction with formaldehyde.

22. As new substances resinous condensation products of formaldehyde and a dihydrazide of a polymethylene dicarboxylic acid in which the carboxyl groups are separated by a chain of at least 3 carbon atoms.

23. As new substances resinous condensation products of formaldehyde and a dihydrazide of a polymethylene dicarboxylic acid in which the carboxyl groups are separated by a chain of at least 3 carbon atoms, the molecular ratio of formaldehyde to dihydrazide being between 0.8 and 1.5, the said condensation products having a melting point below 150° C. and being soluble in hot water and at least swollen by methanol.

24. As new substances resinous condensation products of formaldehyde and a dihydrazide of a polymethylene dicarboxylic acid in which the carboxyl groups are separated by a chain of at least 3 carbon atoms, the molecular ratio of formaldehyde to dihydrazide being between 3 and 5, the said condensation products having a melting point above 150° C. and being insoluble in hot water and in methanol.

JAMES WOTHERSPOON FISHER.
EDWARD WILLIAM WHEATLEY.

REFERENCES CITED

The following references are of record in the file of this patent:

UNITED STATES PATENTS

| Number | Name | Date |
|---|---|---|
| 2,210,442 | Balle et al. | Aug. 6, 1940 |
| 2,211,709 | Zerweck et al. | Aug. 13, 1940 |
| 2,480,514 | Simmons | Aug. 30, 1949 |

OTHER REFERENCES

Blanksma et al.: Rec. Trav. Chim. 58 (1939), pages 498–513.

H. De Graaf: Diss. Leiden, 1930, page 138. Abstracted in C. A. vol. 24, 1930, pages 5723–24.